(12) United States Patent
Bleau et al.

(10) Patent No.: US 8,240,460 B1
(45) Date of Patent: Aug. 14, 2012

(54) APPARATUS FOR CLEANING A CONVEYOR BELT

(75) Inventors: Michael James Bleau, Grand Blanc, MI (US); Jeffrey J. Dellach, Shelby Township, MI (US); Kenneth P. Dellach, Shelby Township, MI (US)

(73) Assignee: Michael James Bleau, Grand Blanc, MI (US)

( * ) Notice: Subject to any disclaimer, the term of this patent is extended or adjusted under 35 U.S.C. 154(b) by 73 days.

(21) Appl. No.: 12/796,302

(22) Filed: Jun. 8, 2010

Related U.S. Application Data

(60) Provisional application No. 61/338,332, filed on Feb. 18, 2010.

(51) Int. Cl.
*B65G 45/14* (2006.01)

(52) U.S. Cl. ........ 198/498; 198/494; 198/495; 198/496; 198/497

(58) Field of Classification Search .......... 198/494–499; 15/250.22, 256.52; 134/129–131, 167 R
See application file for complete search history.

(56) References Cited

U.S. PATENT DOCUMENTS

| | | | |
|---|---|---|---|
| 2,860,354 A | 11/1958 | VanClief, Jr. | |
| 3,116,811 A * | 1/1964 | Stevenson | ....................... 184/17 |
| 3,212,631 A | 10/1965 | Thompson | |
| 3,896,924 A | 7/1975 | Sbarra | |
| 3,957,155 A | 5/1976 | Enchelmaier | |
| 4,860,883 A * | 8/1989 | Knaul et al. | ................... 198/495 |
| 4,960,200 A | 10/1990 | Pierce | |
| 5,355,992 A * | 10/1994 | Baig et al. | ...................... 198/495 |
| 5,400,897 A * | 3/1995 | Doyle | ............................ 198/496 |
| 5,497,872 A | 3/1996 | Pennino | |
| 5,613,594 A | 3/1997 | Kootsouradis | |
| 5,779,024 A | 7/1998 | Harper | |
| 6,533,102 B2 * | 3/2003 | Franzoni et al. | .............. 198/495 |
| 6,804,856 B2 | 10/2004 | Udall | |
| 6,971,503 B2 | 12/2005 | Thompson | |
| 7,014,035 B2 * | 3/2006 | Wiggins | ......................... 198/497 |
| 7,021,455 B2 * | 4/2006 | Nemedi | ................... 198/781.01 |
| 7,234,586 B1 * | 6/2007 | Newman | ....................... 198/495 |
| 7,419,046 B2 | 9/2008 | Cezary | |

* cited by examiner

*Primary Examiner* — Douglas Hess
(74) *Attorney, Agent, or Firm* — Young Basile Hanlon & MacFarlane P.C.

(57) ABSTRACT

An apparatus for cleaning a moving conveyor belt of a conveyor belt assembly. The apparatus includes an enclosed housing connectable to the conveyor belt assembly, wherein the housing has an open portion adjacent to the moving conveyor belt. A hub is rotatably connected to and within the enclosed housing, and a plurality of wipers are releasably connected to and extend outward from the hub. A driving means rotates the hub and the wipers such that the plurality of wipers at least partially engage and wipe the conveyor belt clean, as the wipers rotate through the open portion of the housing.

21 Claims, 4 Drawing Sheets

APPARATUS FOR CLEANING A CONVEYOR BELT

CROSS-REFERENCE TO RELATED APPLICATIONS

This application claims the benefit of U.S. Provisional Patent Application Ser. No. 61/338,332, filed on Feb. 18, 2010.

FIELD OF THE INVENTION

The present invention relates to conveyor belt cleaning devices, and in particular, an inexpensive and simple conveyor belt cleaning apparatus that effectively cleans debris and contaminants from a continuous conveyor belt in an industrial environment.

BACKGROUND OF THE INVENTION

In industry, continuous conveyor belts are often utilized for transporting workpieces between various workstations. In doing so, such conveyor belts may gather debris and other contaminants, such as oil and grease, that may affect the quality of the workpiece or a manufacturing operation being performed on the workpiece. Thus, it is desirable to maintain the cleanliness of such conveyor belts in order to maintain the quality and efficiencies of a manufacturing environment.

Various methods and apparatus have been designed in an attempt to clean such continuous conveyor belts. The simplest methods involve having workers utilize rags or towels to wipe down the conveyor belts as the conveyor belts travel about their continuous loops. Of course, such operations require manual labor and are often met with limited or intermittent success.

Automatic conveyor belt cleaning devices have also been created to eliminate the need for manual labor. For instance, past conveyor belt cleaning devices have utilized automatic scraper edge designs for cleaning the conveyor belt. These systems rely upon the linear motion of a conveyor belt passing over a stationary wiper blade, which subsequently removes or diverts the debris and contaminants on the conveyor belt as required. Although such designs have realized a certain amount of success, the wiper blades often allow the contaminants to collect on the wiper blades, eventually leading to a certain amount of contamination finding its way back onto the conveyor belt, thereby requiring continuous monitoring of the wiper blades.

Other conveyor belt cleaning designs have utilized a rotating cylindrical element, such as a brush-type construction, which rotates in a direction opposite to the direction of travel of the conveyor belt. Although such designs have realized a certain degree of success, such designs are relatively expensive, since they require the use of a motor or drive system, which are typically expensive and high in maintenance.

Other conveyor belt cleaning devices utilize a brush element which sweeps laterally across the conveyor belt. However, these systems are restrictive in their mode of operation, speed, and size. For instance, the brushing action is not uniform over the conveyor belt width, and its speed is, at best, only a direct 1:1 ratio of the conveyor belt speed. The design requires the rotating element to be offset with respect to the center line of the conveyor belt, which in turn produces a cleaning device of greater diameter than the actual belt width.

Therefore, it would be desirable to provide a conveyor belt cleaning apparatus that is simple, inexpensive, efficient, and small in stature.

SUMMARY OF THE INVENTION

The present invention relates to an apparatus for cleaning a moving conveyor belt of a conveyor belt assembly. The apparatus includes an enclosed housing connectable to the conveyor belt assembly, wherein the housing has an open portion adjacent to the conveyor belt. A hub is rotatably connected to and disposed within the enclosed housing. A plurality of wipers are releasably connected to and extend outward from the hub. A driving means is utilized for rotating the hub and the wipers such that the plurality of wipers at least partially engage and wipe the conveyor belt clean as the wipers rotate through the open portion of the housing.

The driving means may include an inlet port connected to the housing, wherein the inlet port is in communication with a pressurized fluid source and the inside of the enclosed housing such that the pressurized fluid applies force to the wipers and the hub, thereby causing the hub and wipers to rotate. The pressurized fluid may include pressurized air or a pressurized liquid. In an alternative embodiment, the driving means may include a motor operably connected to the hub for driving the rotation of the hub and the wipers.

The apparatus may also include a cleaning solution port connected to the housing and in communication with a pressurized cleaning solution source and the inside of the enclosed housing to clean the wipers and the enclosed housing. A drain port may also be connected to the housing, wherein the drain port provides a passageway leading from the inside of the enclosed housing to the outside of the housing to allow for the drainage of debris and fluid from the inside of the housing.

The plurality of wipers of the apparatus may each provide a substantially rigid support member releasably connected to and extending from the hub. A substantially flexible, non-woven material may be releasably connected to the support member, and the flexible, non-woven material may extend outward beyond the support member for engaging the conveyor belt.

A pair of rollers may also be connected to the housing at opposite ends of the opening in the housing, wherein the rollers are engageable with the conveyor belt for proper positioning of the wipers relative to the conveyor belt.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
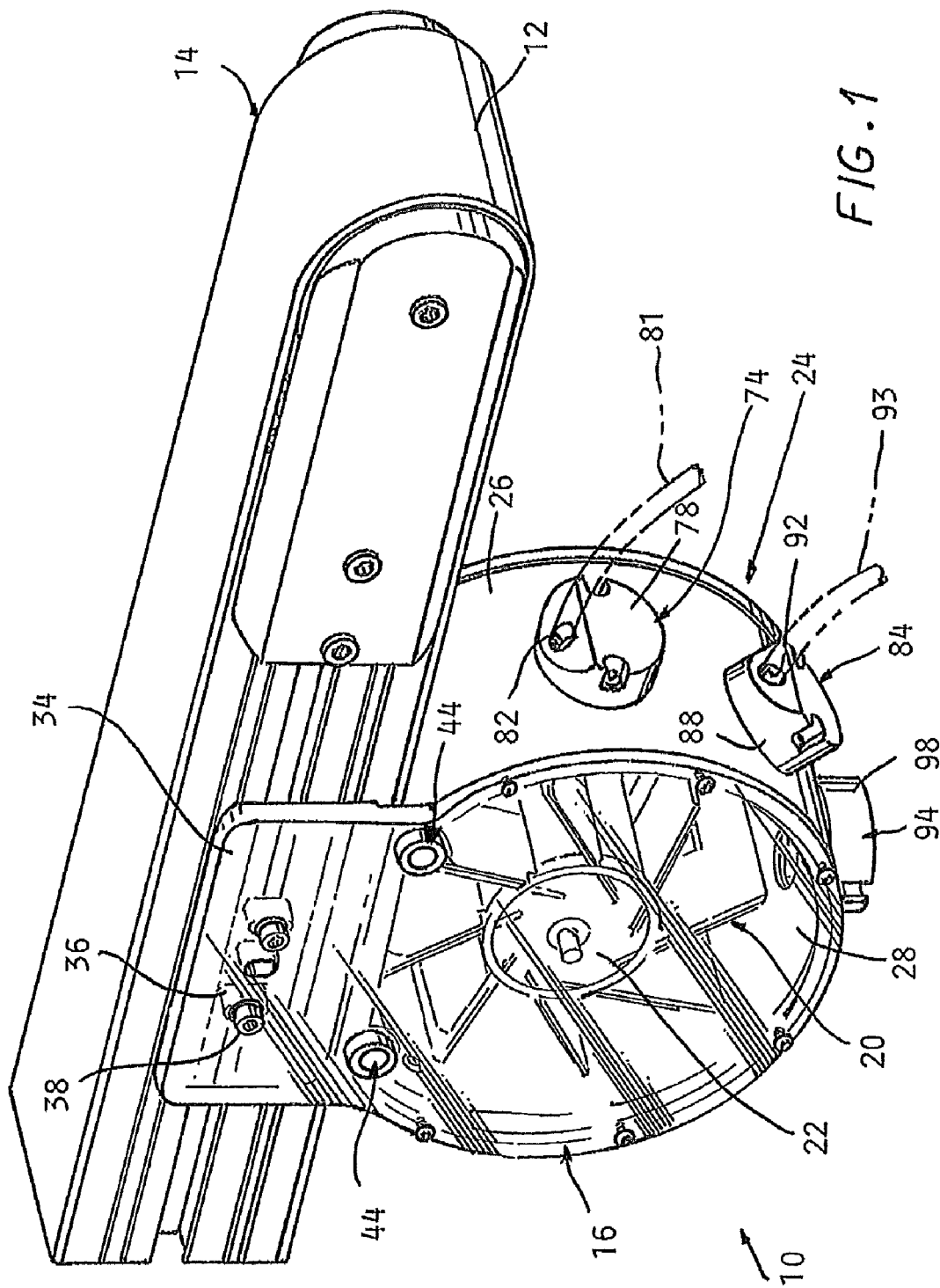
FIG. 1 is a perspective view showing the conveyor belt washer of the present invention mounted on a continuous conveyor belt.
Figure 2:
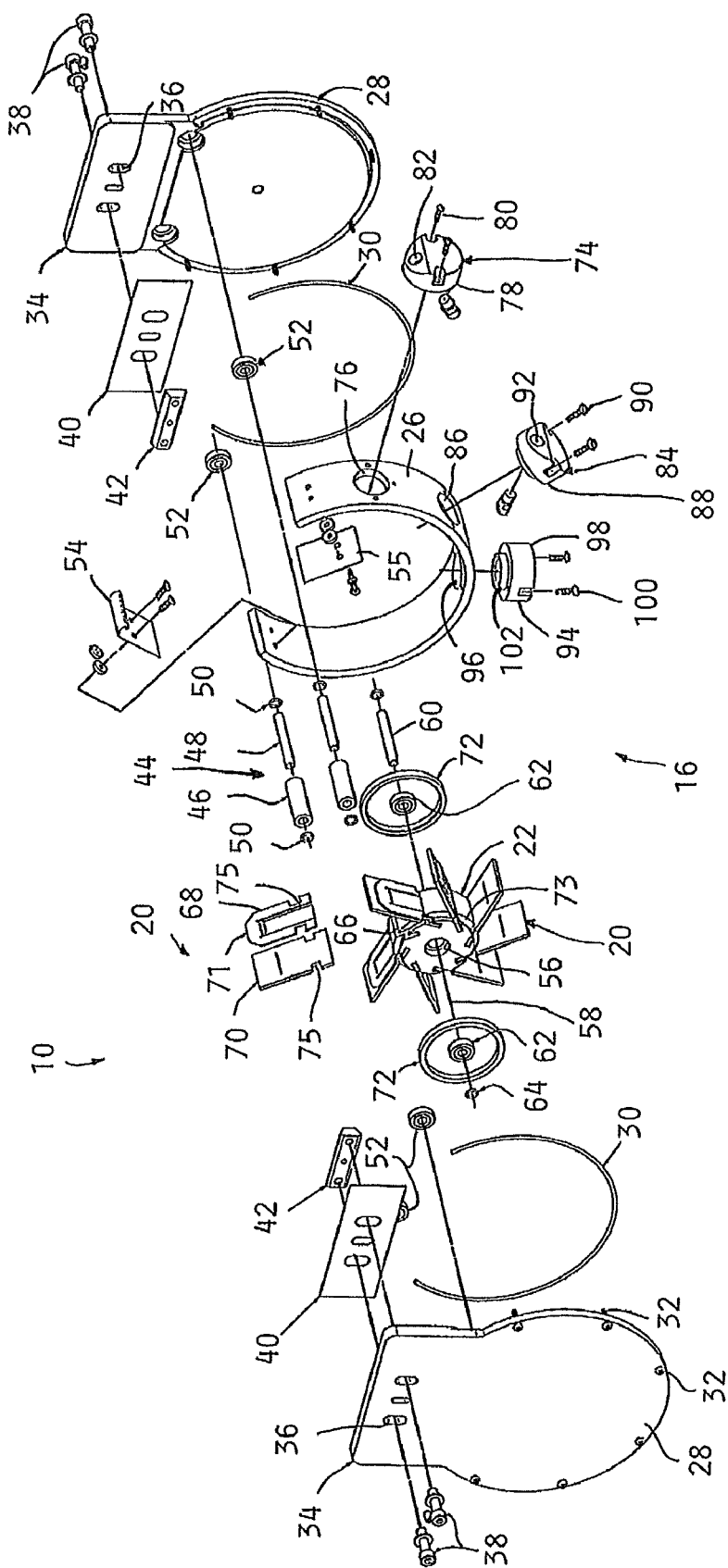
FIG. 2 is an exploded view of the conveyor belt washer of the present invention.
Figures 3, 4, 5:
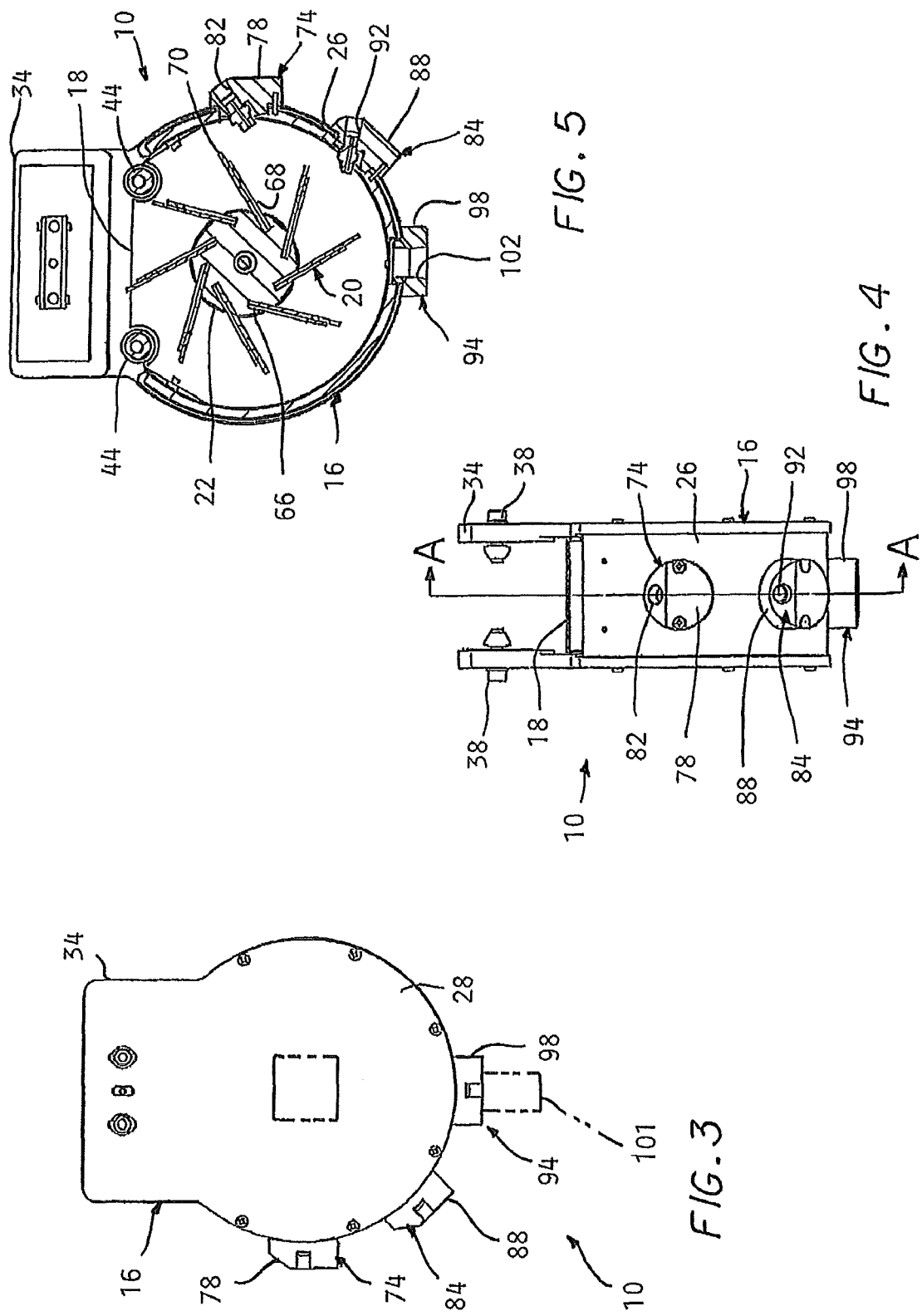
FIG. 3 is a front plan view of the conveyor belt washer of the present invention.
FIG. 4 is a side plan view of the conveyor belt washer of the present invention.
FIG. 5 is a sectional view taken in the direction of arrows AA in FIG. 4 of the conveyor belt washer of the present invention.

Referring to the drawings, the present invention will now be described in detail with reference to the disclosed embodiments.

As illustrated in FIGS. 1-7, the present invention provides a conveyor belt cleaner 10 for cleaning a conveyor belt 12 of a continuous loop conveyor belt assembly 14. As seen in FIG. 1, the conveyor belt cleaner 10 provides a housing 16 that is mounted to the sides and the underside of the conveyor belt assembly 14. The housing 16 of the conveyor belt cleaner 10 has an open portion 18 that is adjacent to the conveyor belt 12 of the conveyor belt assembly 14. The open portion 18 of the housing 16 provides access to the conveyor belt 12 by a plurality of wipers 20 connected to a hub 22 within the housing 16 of the conveyor belt cleaner 10. The hub 22 and the wipers 20 are rotatably driven by a driving means 24 in a direction that is opposite to that of the conveyor belt 12. The ends of the wipers 20 engage and wipe the conveyor belt 12 clean of any debris and contaminants that have collected on the conveyor belt 12.

As seen in FIGS. 1-5, the housing 16 of the conveyor belt cleaner 10 of the present invention has a substantially cylindrical configuration with the open portion 18 formed in an upper portion of the housing 16. The housing 16 is formed by a substantially cylindrical side wall 26 that is fabricated from a lightweight, high-strength material, such as plastic or polyvinyl chloride (PVC). A pair of substantially similar circular covers 28 are connected to both sides of the side walls 26 to enclose the housing 16. The circular covers 28 are fabricated from a lightweight, high-strength, transparent material, such as plastic. The transparency of the circular covers 28 allows the user to view the internal mechanisms of the conveyor belt cleaner 10 and determine whether any debris or contaminants have gathered in the housing 16. A flexible o-ring 30 is mounted between each of the circular covers 28 and the side wall 26 of the housing 16. The flexible o-rings 30 provide a seal between the circular covers 28 and the side wall 26 of the housing 16 to prevent any fluids or contaminants from escaping the housing 16. The circular covers 28 are connected to the side wall 26 through the use of a plurality of conventional fasteners 32.

In order to connect the conveyor belt cleaner 10 to the conveyor belt assembly 14, each of the circular covers 28 of the housing 16 have a substantially rectangular mounting portion 34 that extends integrally from the circular covers 28. The rectangular mounting portion 34 is fabricated from the same translucent material as provided in the circular covers 28. The rectangular mounting portion 34 provides a plurality of elongated slots 36 extending therethrough to allow conventional fasteners 38 to extend through the slots 36 and into corresponding threaded apertures in the conveyor belt assembly 14. A shim plate 40 and a mount nut 42 may be placed between the rectangular mounting portion 34 and the conveyor belt assembly 14 to assist in the mounting of the conveyor belt cleaner 10. The elongated slots 36 in the rectangular mounting portion 34 allow the conveyor belt cleaner 10 to be moved vertically with respect to the conveyor belt assembly 14 so as to provide for the proper engagement of the conveyor belt 12 with the wipers 20 of the conveyor belt cleaner 10.

To further ensure for the proper positioning of the conveyor belt cleaner 10 relative to the conveyor belt assembly 14, the conveyor belt cleaner 10 provides a pair of substantially similar rollers 44 that are located at each end of the open portion 18 of the housing 16. The rollers 44 extend between and are connected to the circular covers 28 of the housing 16 of the conveyor belt cleaner 10. Each roller 44 provides an outer substantially cylindrical limited roller 46 having a shaft 48 extending therethrough. Each end of the roller 44 has a flexible o-ring 50 assembled thereto to seal the rollers 44 with respect to the circular covers 28. A pair of stainless bearings 52 are also connected at each end of the rollers 44 to allow the rollers 44 to spin relative to the housing 16. The rollers 44 assist in positioning the conveyor belt cleaner 10 with respect to the conveyor belt assembly 14, as the conveyor belt cleaner 10 is mounted on the conveyor belt assembly 14 such that the rollers 44 engage the conveyor belt 12 of the conveyor belt assembly 14. By having the rollers 44 engage the conveyor belt 12, the wipers 20 are placed in an optimum position for engaging and wiping the conveyor belt 12 clean. In addition, the rollers 44 allow the conveyor belt 12 to pass and roll over the rollers 44, as the conveyor belt 12 passes through the open portion 18 of the housing 16 of the conveyor belt cleaner 10.

Mud flaps 54, 55 are mounted through conventional fasteners 57 to each end of the side wall 26 of the housing 16 adjacent the rollers 44 to assist in enclosing the housing 16. The mud flap 54 extends over one of the rollers 44, while the mud flap 55 extends under the other roller 44. The mud flap 54 extending over the limited roller 44 allows the conveyor belt 12 to enter at that side of the open portion 18 of the housing 16. The mud flap 55 mounted under the roller 44 allows the conveyor belt 12 to exit at that side of the open portion 18 of the housing 16 of the conveyor belt cleaner 10. The mud flaps 54, 55 prevent any fluid or debris from exiting or entering the housing 16 of the conveyor belt cleaner 10.

In order to wipe the conveyor belt 12 clean of any debris or contaminants, the hub 22 and the wipers 20 are rotatably mounted within the housing 16 of the conveyor belt cleaner 10. The hub 22 has a substantially cylindrical configuration and is fabricated from a lightweight, high-strength material, such as plastic or polyvinyl chloride (PVC). The hub 22 has a throughbore 56 extending along a longitudinal axis 58 of the hub 22. A shaft 60 extends through the bore 56 of the hub 22 with a stainless steel bearing 62 mounted at each end of the shaft 60. Flexible o-rings 64 are seated between the bearings 62 and the circular covers 28 of the housing 16 to seal the bearings 62 with respect to the circular covers 28 of the housing 16. The shaft 60 extends between recesses provided in the circular covers 28 of the housing 16 in order to rotatably secure the hub 22 within the housing 16 of the conveyor belt cleaner 10.

To releasably connect the wipers 20 to the hub 22, the hub 22 has eight equally-spaced and similarly angled slots 66 formed in the periphery of the hub 22 for receiving eight substantially similar wipers 20. Although the present invention is ideally suited for eight wipers 20, the present invention is not limited to eight wipers 20, but rather, any number of wipers 20 may be used that efficiently cleans the conveyor belt 12. However, spacing between the wipers 20 has been found to be an important factor in the efficiency of the conveyor belt cleaner 10, and therefore, changing the spacing of the wipers 20 by changing the number of wipers 20 may affect the performance of the conveyor belt cleaner 10. Each slot 66 in the hub 22 is formed at an angle relative to the radius of the hub 22 such that the wipers 20 extend at an angle of substantially 37° to the radius of the hub 22 as the wipers 20 approach the open portion 18 of the housing 16. Although this angle is deemed to be optimal, it may be possible to vary the angle of the wipers 20 while still obtaining satisfactory results.

Each wiper 20 of the conveyor belt cleaner 10 provides a rigid support member 68 and a substantially flexible pad of non-woven web material 70. Each rigid support member 68 has a substantially rectangular configuration with chamfered corners 71 formed on the end of the rigid support member 68 extending furthest from the hub 22. The center portion of the rigid support member 68 is recessed and separated from the extending end of the rigid support member 68 so as to form substantially parallel portions of the rigid support member 68. This allows a substantially rectangular portion of the non-woven web material 70 to be inserted between the parallel portions of the rigid support member 68 so as to releasably secure the non-woven web material 70 to the rigid support member 68. Both the rigid support member 68 and the non-woven material 70 have corresponding recessed notches 75 formed on both sides of their bottom portions that are inserted into the slots 66 of the hub 22. A hub ring 72 is disposed within a substantially circumferential recess 73 on each end of the hub 22 and within the recessed notches 75 provided in the rigid support member 68 and the non-woven web material 70. The non-woven web material is fabricated from a highly porous, durable material that provides a highly effective material for removing contaminants and debris from the conveyor belt 12. Although other materials may be effective in cleaning the conveyor belt 12, it was found that the non-woven web material 70 of the present invention was highly durable and efficient in cleaning the conveyor belt 12 of the conveyor belt assembly 14.

In order to drive the rotation of the hub 22 and the wipers 20, the conveyor belt cleaner 10 of the present invention provides means for driving 24 the rotation of the hub 22 and the wipers 20. In one embodiment, the driving means 24 may provide an inlet port 74 in the side wall 26 of the housing 16. The inlet port 74 provides an aperture 76 extending through the side wall 26 of the housing 16, wherein a nozzle adapter 78 engages the aperture 76 and is connected to the side wall 26 of the housing 16 through the use of conventional fasteners 80. The nozzle adapter 78 has a substantially cylindrical configuration with an aperture 82 extending through the nozzle adapter 78 and in communication with the aperture 76 in the side wall 26 of the housing 16. The nozzle adapter 78 may be fabricated from a light-weight, high-strength material such as plastic or polyvinyl chloride (PVC). A pressurized fluid source (not shown) may be connected to the aperture 82 in the nozzle adapter 78 through the use of a flexible substantially cylindrical hose 81, so as to supply the pressurized fluid to the inside of the enclosed housing 16 of the conveyor belt cleaner 10. The nozzle adapter 78 directs the pressurized fluid at an appropriate angle so as to engage and rotate the wipers 20 and the hub 22. The pressurized fluid may comprise pressurized air or a pressurized liquid. When using pressurized air, the optimal level of pressurized air is approximately 35 psi. Although the level of pressurized air may vary, the level of pressurized air should not fall below 25 psi, as such lower levels of pressurized air may not be sufficient to properly drive the hub 22 and the wipers 20. At 35 psi, the pressurized air drives the hub 22 and the wipers 20 at approximately 990 rpms.

In an alternative embodiment, the driving means 24 may comprise a conventional motor or drive 83 for rotatably driving the hub 22 and the wipers 20. The motor or drive 83 may be mounted on the housing 16 to operably engage the hub 22. Preferably, the motor or drive 83 drives the hub 22 at approximately 990 rpms. Although the motor or drive 83 may be used to drive the hub 22 and the wipers 20 of the conveyor belt cleaner 10, the motor or drive 83 may require greater expense and maintenance as compared to the pressurized fluid source as described above.

To provide a cleaning solution to the conveyor belt cleaner 10, a cleaning solution port 84 is provided on the side wall 26 of the housing 16 of the conveyor belt cleaner 10. The cleaning solution port 84 includes an aperture 86 extending through the side wall 26 of the housing 16. A nozzle adapter 88 engages the aperture 86 and is connected to the side wall 26 of the housing 16 through the use of conventional fasteners 90. The nozzle adapter 88 is substantially cylindrical and provides an aperture 92 extending through the nozzle adapter 88. The nozzle adapter 88 may be fabricated from a light-weight, high-strength material such as plastic or polyvinyl chloride (PVC). A pressurized cleaning solution source (not shown) is connected to the aperture 92 in the nozzle adapter 88 through the use of a substantially cylindrical flexible hose 93 in order to supply a cleaning solution to the inside of the enclosed housing 16. The cleaning solution may comprise of potable water or a conventional cleanser. The cleaning solution wets the non-woven web material 70 of the wipers 20 to assist in the cleaning of the conveyor belt 12. The cleaning solution also assists in cleaning the wipers 20 from any debris or contaminants that may collect on the wipers 20. In addition, the cleaning solution will assist in rinsing and cleaning the internal surfaces and mechanisms of the enclosed housing 16.

In order to drain the cleaning solution and any debris and contaminants that collect within the housing 16, the conveyor belt cleaner 10 provides a drain port 94 for draining any such materials from the interior of the housing 16. The drain port 94 provides an aperture 96 extending through the side wall 26 of the housing 16. A substantially cylindrical drain adapter 98 engages the aperture 96 and is connected to the side wall 26 of the housing 16 through the use of conventional fasteners 100. The drain adapter 98 has an aperture 102 extending therethrough so as to allow for the drainage of any fluid, debris, and contaminants within the housing 16 of the conveyor belt cleaner 10. The drain adapter 98 may be fabricated from a light-weight, high-strength material such as plastic or polyvinyl chloride (PVC). A hose (not shown) may be connected to the aperture 102 of the drain adapter 98 so as to direct any drained material to a waste container or drain. In addition, a venturi 101 may be connected to the drain adapter 98 such that when pressurized air is supplied to the venturi 101, fluid and contaminants are drawn from the enclosed housing 16 into the drain adapter 98 so as to assist with the draining of the housing 16.

Figure 6:
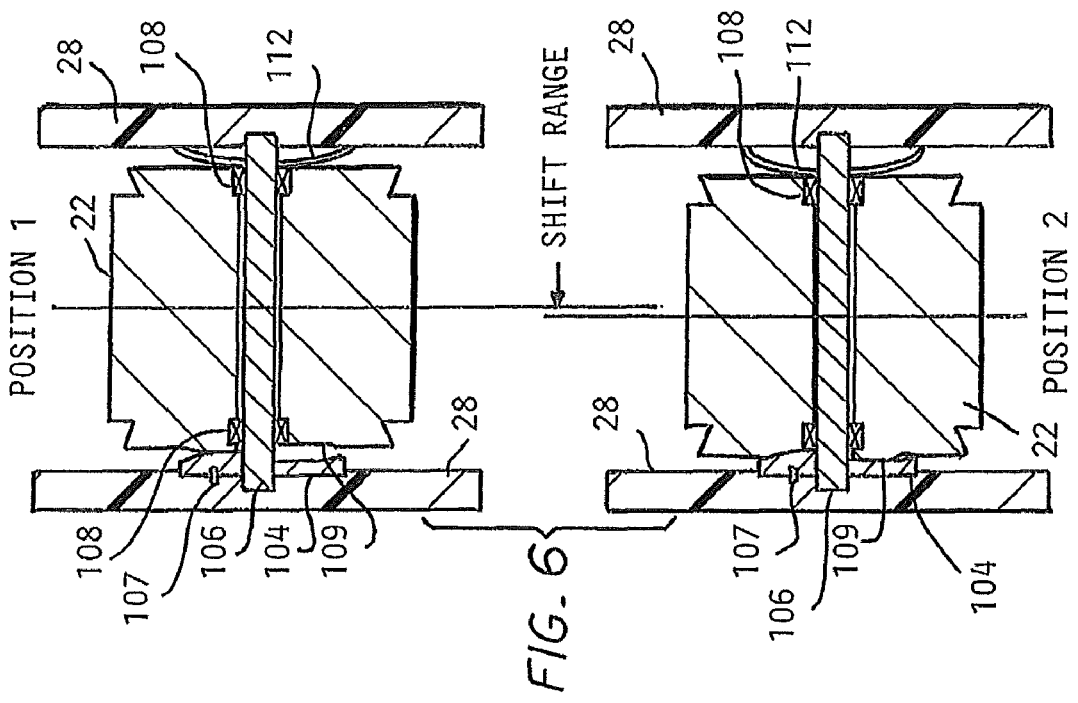
FIG. 6 is a schematic diagram showing another embodiment of the conveyor belt washer of the present invention having a lateral oscillation design using a cam washer.

In yet another embodiment, it may be desirable to clean larger conveyor belts 12 by overlapping or stacking hubs 22 in multiple conveyor belt cleaners 10. As seen in FIG. 6, the conveyor belt cleaner 10 may utilize a cam washer 104 mounted on a stationary shaft 106 extending between the circular covers 28 of the housing 16. A dowel pin 107 extends from one of the circular covers 28 into the cam washer 104 to prohibit movement of the cam washer 104 and the stationary shaft 106. Roller bearings 108 are provided between the stationary shaft 106 and the hub 22 so as to allow the hub 22 to freely rotate on the stationary shaft 106. The end of the hub 22 has a contoured surface 109 that acts as a cam follower in following the shape of the cam washer 104. A plastic Belleville washer or disc spring 112 is mounted on the opposite end of the stationary shaft 106 between the other circular cover 28 and the hub 22. The Belleville washer or disc spring 112 biases the hub 22 against the cam washer 104 so that the contoured surface 109 of the hub 22 follows the cam surface of the cam washer 104. This allows the hub 22 to move laterally on the stationary shaft 106 between position 1 and position 2, as shown in FIG. 6, as the hub 22 rotates, thereby allowing the wipers 20 to clean a greater amount of surface area on the conveyor belt 12.

Figure 7:
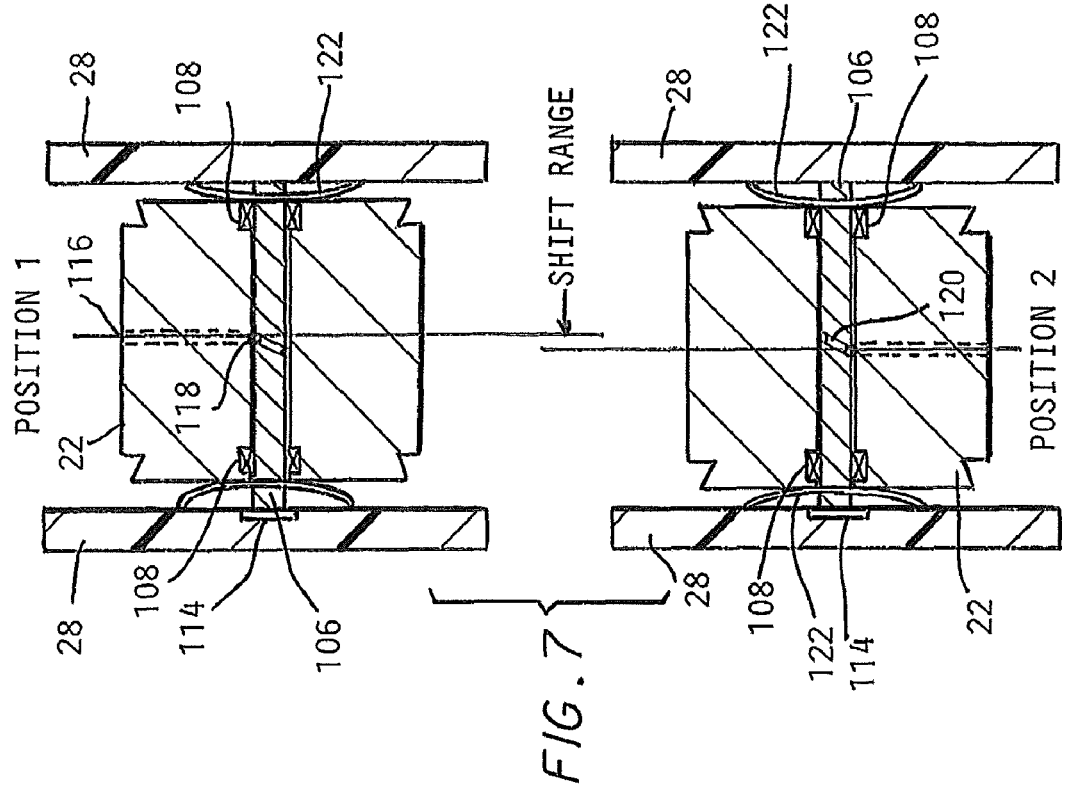
FIG. 7 is a schematic diagram showing yet another embodiment of the conveyor belt washer of the present invention having a lateral oscillation design using a ball bearing/cam follower.

In yet another embodiment, FIG. 7 shows a conveyor belt cleaner 10 that may be utilized when using overlapping or stacked hubs 22 of various conveyor belt cleaners 10. This embodiment utilizes a stationary shaft 106 as described in the previous embodiment along with roller bearings 108 mounted between the hub 22 and the stationary shaft 106. Here, however, the stationary shaft 106 may be held stationary through the use of a dowel pin 114 extending between the stationary shaft 106 and one of the circular covers 28. A pocket 116 is provided in the hub 22 for mounting a ball bearing 118 on the inner diameter of the hub 22. A continuous cam groove 120 is formed in the stationary shaft 106 such that the ball bearing 118 follows the cam groove 120 when the hub 22 rotates about the stationary shaft 106. Plastic Belleville washers or disc springs 122 are mounted at each end of the stationary shaft 106 between the hub 22 and the circular covers 28 of the housing 16. The Belleville washer or disc springs 122 assist in stabilizing the hub 22 during its lateral movement. Thus, when the hub 22 rotates about the stationary shaft 106, the ball bearing 118 follows the groove 120 in the stationary shaft 106, thereby allowing the hub 22 to move laterally along the stationary shaft 106 between position 1 and position 2, as shown in FIG. 7, thereby cleaning a greater amount of surface area on the conveyor belt 12.

In operation, the conveyor belt cleaner 10 is mounted to the sides and the underside of the conveyor belt assembly 14. If pressurized air is utilized as the driving means 24, the pressurized air source is connected to the inlet port 74. The pressurized cleaning solution source is then connected to the cleaning solution port 84. The pressurized air and the pressurized cleaning solution are both engaged for approximately ten seconds so as to rinse the non-woven web material 70 of the wipers 20. After the ten seconds expires, the pressurized cleaning solution is disengaged, and the pressurized air is allowed to continue to rotate the hub 22 and the wipers 20. This allows any excess cleaning solution to be wrung from the non-woven web material 70 of the wipers 20. This cycle should continue for approximately ten seconds. After the ten seconds expires, the conveyor belt 12 is engaged, thereby allowing the conveyor belt 12 of the conveyor belt assembly 14 to pass through the open portion 18 of the housing 16. As the pressurized air drives the rotation of the hub 22 and the wipers 20, the non-woven web material 70 of the wipers 20 engages and wipes the conveyor belt 12 clean. This cycle should occur for approximately one-hundred thirty (130) seconds or until the entire conveyor belt 12 has passed through the conveyor belt cleaner 10. After the one-hundred thirty (130) seconds expire, the conveyor belt 12 is disengaged, and the pressurized cleaning solution is actuated along with the pressurized air, thereby allowing for the rinsing of all debris and contamination from the wipers 20 as well as the internal mechanisms of the housing 16. This cycle should continue for approximately ten seconds. After the ten seconds expires, the pressurized cleaning solution is disengaged, and the pressurized air is allowed to spin the hub 22 and the wipers 20 to wring out the non-woven web material 70 of any excess cleaning solution. The conveyor belt cleaner cycle is complete, and the conveyor belt 12 is clean. The conveyor belt cleaner cycle may then be repeated at various times, depending on the cleanliness of the conveyor belt 12.

While the invention has been described in connection with what is presently considered to be the most practical and preferred embodiment, it is to be understood that the invention is not to be limited to the disclosed embodiments but, to the contrary, is intended to cover various modifications and equivalent arrangements included within the spirit and scope of the appended claims. The scope is to be accorded the broadest interpretation so as to encompass all such modifications and equivalent structures as is permitted under the law.

What is claimed is:

1. An apparatus for cleaning a moving conveyor belt of a conveyor belt assembly, comprising:
    an enclosed housing connectable to said conveyor belt assembly, and said housing having an open portion adjacent to said moving conveyor belt;
    a hub rotatably connected to and within said enclosed housing;
    a plurality of substantially planar wipers enclosed within said housing and releasably connected to and extending outward from said hub at an acute angle from said hub; and
    means for driving the rotation of said hub and said wipers such that said plurality of wipers at least partially engage and wipe said moving conveyor belt clean, as said wipers rotate through said open portion of said housing.

2. The apparatus stated in claim 1, wherein said driving means further comprises:
    a motor operably connected to said hub for driving the rotation of said hub and said wipers.

3. The apparatus stated in claim 1, further comprising:
    a cleaning solution port connected to said housing and in communication with a pressurized cleaning solution source and the inside of said enclosed housing to clean said wipers and said enclosed housing.

4. The apparatus stated in claim 1, further comprising:
    a drain port connected to said housing wherein said drain port provides a passageway leading from the inside of said enclosed housing to the outside of said housing to allow for the drainage of debris and fluids from said enclosed housing.

5. The apparatus stated in claim 1, wherein each of said plurality of wipers further comprise:
    a substantially rigid support member releasably connected to and extending from said hub; and
    a substantially flexible, non-woven web material releasably connected to said support member, and said flexible, non-woven web material extending outward beyond said support member.

6. The apparatus stated in claim 1, further comprising:
    a pair of rollers connected to said housing at opposite ends of said opening in said housing, wherein said rollers are engageable with said conveyor belt for proper positioning of said wipers relative to said conveyor belt.

7. An apparatus for cleaning a moving conveyor belt of a conveyor belt assembly, comprising:
    an enclosed housing connectable to said conveyor belt assembly, and said housing having an open portion adjacent to said moving conveyor belt;
    a hub rotatably connected to and within said enclosed housing;
    a plurality of wipers releasably connected to and extending outward from said hub;
    means for driving the rotation of said hub and said wipers such that said plurality of wipers at least partially engage and wipe said moving conveyor belt clean, as said wipers rotate through said open portion of said housing; and
    an inlet port provided in said housing wherein said inlet port is in communication with a pressurized fluid source and the inside of said enclosed housing such that said pressurized fluid applies a force to said wipers and said hub, thereby causing said hub and said wipers to rotate.

8. An apparatus for cleaning a moving conveyor belt of a conveyor belt assembly, further comprising:
    an enclosed housing connectable to said conveyor belt assembly, and said housing having an open portion adjacent to said moving conveyor belt;

a hub rotatably connected to and within said enclosed housing, and said hub having a plurality of slots formed at an acute angle in the periphery of said hub;
a plurality of substantially planar wipers enclosed within said housing releasably connected to said hub by inserting said wipers into said slots in said hub such that said wipers extend outward from said hub at an acute angle;
said wipers each having a substantially rigid support member and a substantially flexible, non-woven web material releasably connected to said rigid support member, wherein said non-woven material extends beyond the length of said rigid support member; and
means for driving the rotation of said hub and said wipers such that said plurality of wipers at least partially engage and wipe said moving conveyor belt clean with said non-woven web material, as said wipers rotate through said open portion of said housing.

9. The apparatus stated in claim 8, wherein said driving means further comprises:
an inlet port provided in said housing wherein said inlet port is in communication with a pressurized fluid source and the inside of said housing such that said pressurized fluid applies a force to said wipers and said hub, thereby causing said hub and said wipers to rotate.

10. The apparatus stated in claim 8, wherein said driving means further comprises:
a motor operably connected to said hub for driving the rotation of said hub and said wipers.

11. The apparatus stated in claim 8, further comprising:
a cleaning solution port connected to said housing, and said cleaning solution port in communication with a pressurized cleaning solution source and the inside of said enclosed housing so as to clean said wipers and said enclosed housing.

12. The apparatus stated in claim 8, further comprising:
a drain port connected to said housing, wherein said drain port provides a passageway leading from the inside of said enclosed housing to the outside of said enclosed housing to allow for the drainage of debris and fluid from said enclosed housing.

13. The apparatus stated in claim 8, further comprising:
a pair of rollers connected to said housing at opposite ends of said opening in said housing, wherein said rollers are engageable with said conveyor belt for proper positioning of said wipers relative to said conveyor belt.

14. An apparatus for cleaning a moving conveyor belt of a conveyor belt assembly, comprising:
an enclosed housing connectable to said conveyor belt assembly, and said housing having an open portion adjacent to said moving conveyor belt;
a hub rotatably connected to and within said enclosed housing, and said hub having a plurality of slots formed in the periphery of said hub, wherein said slots extend at an angle relative to a radius of said hub;
a plurality of substantially planar wipers releasably connected to said hub by inserting said wipers into said slots in said hub such that said wipers extend at said angle relative to said radius of said hub;
each of said wipers having a substantially rigid support member and a substantially flexible, non-woven web material releasably connected to said rigid support member, wherein said non-woven web material extends beyond the length of said rigid support member;
means for driving the rotation of said hub and said wipers such that said plurality of wipers at least partially engage and wipe said conveyor belt clean with said non-woven web material when said wipers rotate through said open portion of said housing; and
a pair of rollers connected to said housing at opposite ends of said opening in said housing, wherein said rollers are engageable with said moving conveyor belt for proper positioning of said wipers relative to said conveyor belt.

15. The apparatus stated in claim 14, wherein said driving means further comprises:
an inlet port provided in said housing wherein said inlet port is in communication with a pressurized fluid source and the inside of said enclosed housing such that said pressurized fluid applies a force to said wipers and said hub, thereby causing said hub and said wipers to rotate.

16. The apparatus stated in claim 14, wherein said driving means further comprises:
a motor operably connected to said hub for driving the rotation of said hub and said wipers.

17. The apparatus stated in claim 14, further comprising:
a cleaning solution port connected to said housing, and said cleaning solution port in communication with a pressurized cleaning solution source and the inside of said enclosed housing so as to clean said wipers and said enclosed housing.

18. The apparatus stated in claim 14, further comprising:
a drain port connected to said housing wherein said drain port provides a passageway leading from an inside of said enclosed housing to the outside of said enclosed housing to allow for the drainage of debris and fluid from said enclosed housing; and
a venturi in communication with said drain port and a pressurized air supply such that said venturi draws fluid and contaminants from said housing into said drain port.

19. An apparatus for cleaning a moving conveyor belt of a conveyor belt assembly, comprising:
an enclosed housing connectable to said conveyor belt assembly, and said housing having an open portion adjacent to said moving conveyor belt;
a pair of rollers connected to said housing at opposite ends of said opening in said housing, wherein said rollers are engageable with said moving conveyor belt for proper positioning of said wipers relative to said conveyor belt;
a hub rotatably connected to and within said enclosed housing, and said hub having a plurality of slots formed in the periphery of said hub, wherein said slots extend at an angle to a radius of said hub;
a plurality of wipers releasably connected to said hub by inserting said wipers into said slots in said hub such that said wipers extend at said angle to said radius of said hub;
each of said wipers having a substantially rigid support member and a substantially flexible, non-woven web material releasably connected to said rigid support member, wherein said non-woven web material extends beyond the length of said rigid support member;
means for driving the rotation of said hub and said wipers such that said plurality of wipers at least partially engage and wipe said conveyor belt clean with said non-woven web material when said wipers rotate through said open portion of said housing;
a stationary shaft connected to said housing;
said hub rotatably mounted on said shaft, wherein said hub may move laterally along said shaft; and
means for inducing lateral movement of said hub on said shaft.

20. The apparatus stated in claim 19, wherein said movement inducing means further comprises:

a cam washer connected to said shaft and having a cam surface;

a contoured surface formed on said hub; and means for biasing said hub against said cam washer to allow said contoured surface on said hub to follow said cam surface on said cam washer.

21. The apparatus stated in claim 19, wherein said movement inducing means further comprises:

a pair of biasing members mounted on opposite ends of said shaft and engaging said hub;

a ball bearing mounted on an inside diameter of said hub; and a spiral groove formed in the outside diameter of said stationary shaft wherein said ball bearing matingly engages and follows said groove thereby causing said hub to move laterally along said stationary shaft.

* * * * *